US012595124B2

(12) United States Patent
Stefani et al.

(10) Patent No.: US 12,595,124 B2
(45) Date of Patent: Apr. 7, 2026

(54) ELEVATOR LOCKING DEVICE FOR A VERTICAL AUTOMATIC WAREHOUSE

(71) Applicant: MODULA S.P.A., Casalgrande (IT)

(72) Inventors: Franco Stefani, Sassuolo (IT); Stefano Cassani, Imola (IT)

(73) Assignee: MODULA S.P.A., Casalgrande (IT)

( * ) Notice: Subject to any disclaimer, the term of this patent is extended or adjusted under 35 U.S.C. 154(b) by 945 days.

(21) Appl. No.: 17/787,362

(22) PCT Filed: Nov. 20, 2020

(86) PCT No.: PCT/IB2020/060956
§ 371 (c)(1),
(2) Date: Jun. 20, 2022

(87) PCT Pub. No.: WO2021/123967
PCT Pub. Date: Jun. 24, 2021

(65) Prior Publication Data
US 2022/0371823 A1      Nov. 24, 2022

(30) Foreign Application Priority Data
Dec. 20, 2019      (IT) ........................ 102019000024976

(51) Int. Cl.
B65G 1/06              (2006.01)
(52) U.S. Cl.
CPC ............ B65G 1/06 (2013.01); B65G 2207/40 (2013.01)

(58) Field of Classification Search
CPC ........ B65G 1/06; B65G 2207/40; B65G 1/04; G07F 11/10; G07F 11/165
See application file for complete search history.

(56) References Cited

U.S. PATENT DOCUMENTS

| | | | | |
|---|---|---|---|---|
| 4,113,119 | A | * | 9/1978 | Brown ................. B65G 1/0407 414/281 |
| 5,915,909 | A | * | 6/1999 | Smith .................. B65G 1/0421 414/280 |
| 9,546,021 | B2 | * | 1/2017 | Stover .................... B65D 19/44 |

(Continued)

FOREIGN PATENT DOCUMENTS

| | | | | |
|---|---|---|---|---|
| IT | 202100020966 | A1 * | 2/2023 | ............... B65G 1/04 |
| JP | S6137601 | * | 2/1986 | ............... B65G 1/00 |
| JP | S6137601 | A | 2/1986 | |

(Continued)

*Primary Examiner* — Jacob S. Scott
*Assistant Examiner* — Erin Morris
(74) *Attorney, Agent, or Firm* — Volpe Koenig

(57)              ABSTRACT
An automatic warehouse (1), comprising: a frame (2), defining a prismatic-shaped containment volume (V), with a vertical axis (X); an elevator (3), arranged inside the containment volume (V), comprising a flat bed (4), movable along a vertical direction; a locking device (101), interposed between the frame (2) and the elevator (3), which is operable between a locking configuration, in which the elevator (3) is constrained to the frame (2) with respect to the vertical movements and cannot move vertically, and a release configuration, in which the elevator (3) can move vertically. The locking device (101) can be activated on command from a predetermined zone of the frame (2), which can be positioned with great flexibility, based on any access needs.

12 Claims, 11 Drawing Sheets

(56) References Cited

U.S. PATENT DOCUMENTS

2010/0104405 A1*   4/2010   Amada ..................... B66F 9/07
                                                 414/281
2017/0320669 A1*  11/2017   Kilibarda ............... B66C 17/06

FOREIGN PATENT DOCUMENTS

WO          WO-9420393  A1 *   9/1994   ........... B65G 1/1371
WO      WO-2018142241  A1 *   8/2018   ............... B65G 1/04

* cited by examiner

Fig.3B
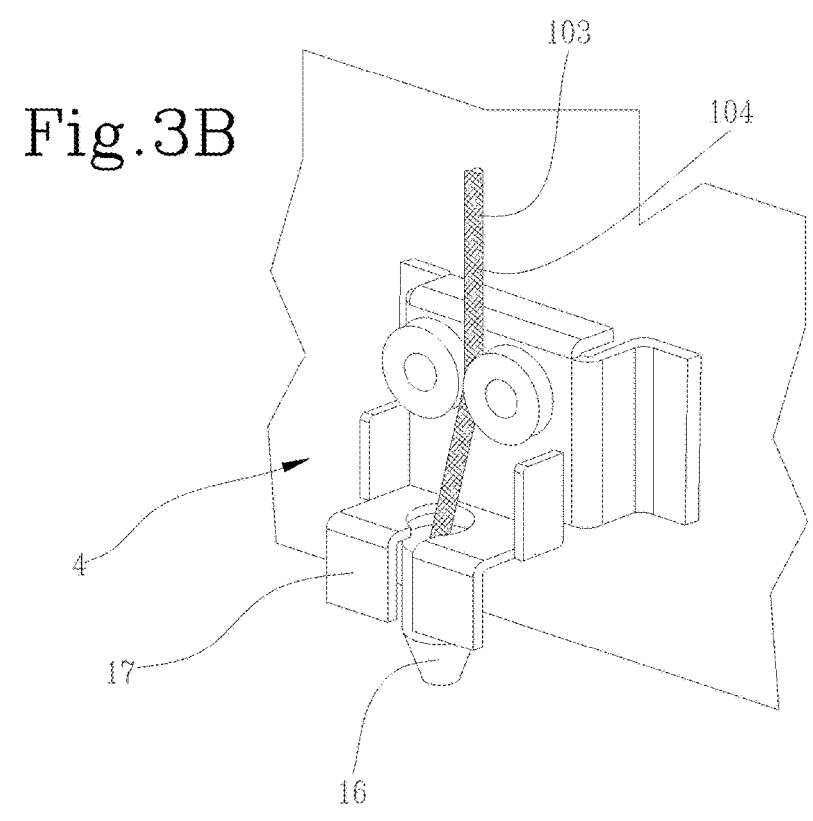
Fig.3A
Fig. 3C
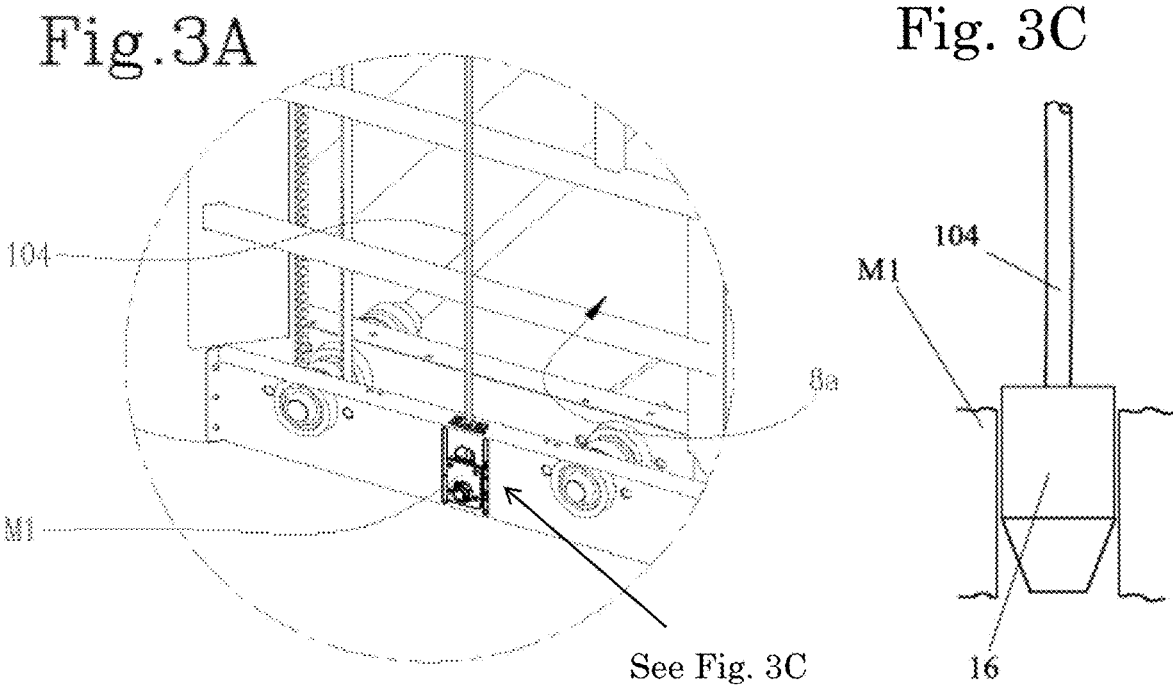
See Fig. 3C

ELEVATOR LOCKING DEVICE FOR A VERTICAL AUTOMATIC WAREHOUSE

TECHNICAL FIELD

The present invention relates to a vertical automatic warehouse with particular focus on an apparatus for safeguarding operations of installation, maintenance and fault resolution.

BACKGROUND

In the manufacturing sector and in particular, with regard to the steps of storing products and semi-finished products, it is extremely important to be able to guarantee workers' safety.

In fact, to optimize the use of spaces, it is often necessary to stack products or store them at heights, for example, by using the so-called automatic vertical warehouses, during the use of which there is an elevated risk of falling, for example, due to the collapsing of the kinematic system, which moves the elevator vertically.

However, such warehouses may require regular maintenance and interventions in order to resolve faults, such as, for example, the unlocking of a drawer or the correction, in situ, of problems present on the elevator or on the kinematic system, which moves the elevator vertically.

The apparatus and methods usually applied comprise that, in order to carry out such maintenance, the operator climbs up secured to the structure of the warehouse, typically using special ladders present on the frame of the structure itself, and proceeds with making the elevator safe and, in particular, the supporting platform.

The step of making the elevator safe is due to the fact that, after sudden, unexpected problems of collapsing of the kinematic system, which regulates the movement thereof, it could give way, endangering both the operator who is working supported by the elevator and the operator working therebelow.

Known technology comprises securing the platform to the vertical warehouse by means of special ratchet fixing belts with which the two opposite ends of the supporting platform are constrained to respective portions of the frame, close and facing thereto.

In particular, to secure the elevator to the structure, it is necessary to lock both sides thereof (right and left side) as the elevator is usually very wide, the load on board could be elevated and the guiding system would not be capable of supporting the torque, which would be generated if only one side thereof were supported.

Therefore, the Applicant has observed that the apparatus and methods of the prior art have different disadvantages, which make the use and implementation thereof underperforming and also affect the operator's safety.

First of all, particularly for those interventions to be carried out at elevated heights, the operator must climb up on both sides of the vertical warehouse to constrain the platform, which makes the operation demanding in terms of time.

Furthermore, if the vertical automatic warehouse is provided with paneling installed to cover the frame, it will take the operator longer to dismantle and reassemble the panels.

Furthermore, if one of the two lateral sides is not accessible (for example, due to the fact that the vertical automatic warehouse is flanked by a wall or another vertical warehouse), the operator will not be able to access it directly.

Thus, in this latter case, the operator will be forced to climb up only on the side, which is not obstructed and, after securing a first side of the elevator, he/she must climb up on top to reach the second end, encountering the previously stated problems of unilaterally distributed mechanical stress.

If both sides of the warehouse are obstructed, being unable to use the ladders, the operator will be unable to reach the two ends of the elevator and make them safe. An example of an automatic warehouse is shown in U.S. Pat. No. 5,915,909.

SUMMARY

In this context, the technical task underlying the present invention is to propose a vertical automatic warehouse with annexed apparatus for securing the elevator, which overcomes at least some of the drawbacks of the prior art stated above.

In particular, it is an object of the present invention to provide a vertical automatic warehouse capable of making the securing of the elevator devoid of risks for the operator, particularly if at least one side of the warehouse is obstructed.

It is a further object of the present invention to provide a vertical automatic warehouse capable of making the securing of the elevator quicker and more efficient so as to reduce the length of the operations.

The stated technical task and specified objects are substantially achieved by a vertical automatic warehouse comprising the technical features presented in the claims.

In particular, the dependent claims correspond to possible embodiments of the invention.

Further features and advantages of the present invention will become clearer from the description, which is illustrative and thus not limiting, of a preferred, but non-exclusive embodiment of an apparatus and locking method for automatic vertical warehouses.

BRIEF DESCRIPTION OF THE DRAWINGS

Such description will be presented here below with reference to the accompanying drawings, provided for illustrative purposes only and thus non-limiting, wherein:

FIG. 3a shows a first detail of the locking apparatus according to the present invention;

FIG. 3b shows a second detail of the locking apparatus according to the present invention;

FIG. 3C shows a detail of the locking apparatus according to the present invention;

DETAILED DESCRIPTION OF THE PREFERRED EMBODIMENTS

Figure 1:
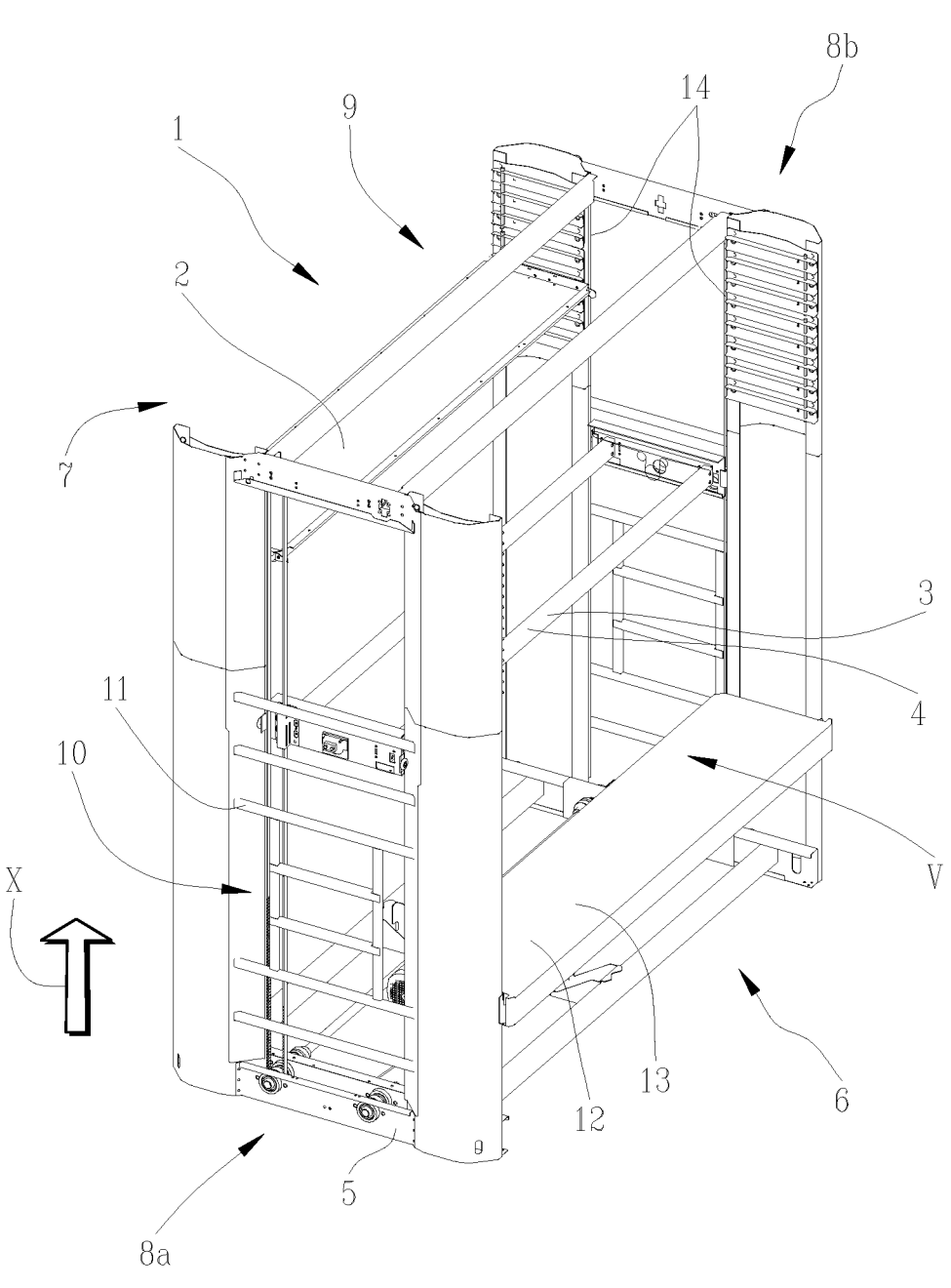
FIG. 1 shows an isometric schematic view of a vertical automatic warehouse according to the present invention.

The automatic warehouse (1) according to the present invention comprises a frame (2), which defines a prismatic-shaped containment volume (V). The frame (2), like the containment volume (V) and the automatic warehouse (1) in general, extend principally vertically (i.e. having a vertical axis X). In other words, the height of the frame (2) is greater than the plan dimensions of the frame (2). The overall shape of the frame (2) is not necessarily a regular parallelepiped, as shown in the accompanying figures. For example, the frame (2) could comprise two or more portions of a different height.

The frame (2) comprises a plurality of uprights and crosspieces, variously connected to one another in a manner known in the sector, defining a load-bearing structure. In the illustrated non-exclusive embodiment, the frame (2) defines an overall prismatic shaped-structure, in the illustrated case with a parallelepiped shape. In particular, the frame (2) has at least two side faces or sides (8a,8b). The sides (8a,8b) have two main dimensions: height, measured vertically, and depth, measured horizontally.

Preferably, but not necessarily, the frame (2) is provided with two ladders (10) (11), arranged on the sides (8a,8b). The ladders (10) allow an operator to climb along the frame (2) and, furthermore, they allow the structure of the frame to be strengthened, using a small quantity of material.

The frame (2) also has a base (5), a front face (6), a rear face (7) and an upper face (9). The front (6) and rear (7) faces having two main dimensions: height, measured vertically and substantially coinciding with the height of the sides, and width, measured horizontally and perpendicular to the depth of the sides (8a,8b).

A plurality of shelves or drawers (13) are arranged inside the frame (2), i.e. inside the containment volume (V), substantially distributed on two vertical columns, each of which defines a shelving system (12). Two shelving systems (12) are present in the illustrated embodiment. In order to optimize the use of the containment space (V), the shelving systems (12) are arranged along the front face (6) and the rear face (7) of the frame (2). In the illustrated embodiment, each shelf or drawer (13) lies on a horizontal plane.

Paneling (not shown in the figure) can be installed on the outside of the frame (2) with the object of covering the entire structure.

The automatic warehouse (1) according to the present invention comprises an elevator (3), arranged inside the containment volume (V). The elevator (3) comprises a supporting platform (4), designed to support one or more objects, for example shelves or drawers (13) with which the automatic warehouse (1) is provided, and is movable along a vertical direction by motor means, known in the sector and thus not represented in detail.

In the illustrated embodiment, the platform (4) is movable between the two shelving systems (12). In other words, the two shelving systems (12) are separated by an intermediate space inside which the platform (4) is vertically movable. Vertically oriented sliding guides (14) are provided to guide the platform (4) along the direction of vertical movement. Preferably, the sliding guides (14) are structured to prevent horizontal movements of the platform (4). The platform (4) has a width substantially coinciding with the width of the shelves or drawers (13) and extends between the two sides (8a,8b) of the frame (2).

In a manner known in the sector, the elevator (3) comprises translator means, designed to move the objects between the platform (4) and each of the shelves or drawers (13) of the shelving systems (12), or to move the shelves or drawers (13) directly between the platform (4) and the shelving systems (12). Such translator means are not illustrated in detail.

The automatic warehouse (1) according to the present invention comprises a locking device (101), interposed between the frame (2) and the platform (4), which is operable between a locking configuration, in which the platform (4) is constrained to the frame (2) with respect to the vertical movements and thus, cannot move vertically, and a release configuration, in which the platform (4) can move vertically. The locking device (101) is operable, on command, in the locking position, to lock the platform (4) at a predetermined height, and allow safe access by an operator for maintenance. The locking device (101) can be activated, on command, in the release position, to resume mobility and normal operation of the platform (4).

The locking device (101) comprises a support member (103). Such support member (103) can be of the flexible type (and not extensible) and comprise, for example, a cord (preferably made of steel), a chain, a belt or another equivalent element. The support member (103) could also be of the rigid type, for example, in the shape of a rod or a substantially rigid section bar.

The support member (103) is connected to the frame (2) so as to be able to support the weight associated with the platform (4).

In the locking configuration, the support member (103) has a first portion (104), constrained to a first tip of the platform (4), and a second portion (105), spaced apart from the first portion (104), constrained to the frame (2) and/or to a second tip of the platform (4), so that the platform (4) is locked with respect to the sliding along the vertical axis (X) and the weight associated with the platform (4) is supported by the frame (2), through the support member (103).

In the release configuration, the support member (103) isn't constrained to the platform (4) or it isn't constrained to the frame (2), to allow a free movement of the platform (4) along a vertical direction.

In the embodiments shown in the figures from 2 to 6, in the locking configuration, the support member (103) has a first portion (104), hooked to the platform (4), and a second portion (105), spaced apart from the first portion (104), anchored in a stable position to the frame (2), to lock the vertical sliding of the platform (4) with respect to the frame (2). In the release configuration, the support member (103) has at least one of the first portion (104) and the second portion (105) anchored in a stable position to the frame (2), while the platform (4) isn't hooked to the support member (103) and is free to slide with respect to the support member (103). In this way, the locking configuration can be activated substantially by acting only on the second portion (105), which will be clarified below in the description. As the second portion (105) of the support member (103) can be placed in any part of the frame (2), the possibility of obtaining the locking configuration by acting on the only second portion (105) allows the positioning of the automatic warehouse (1) without comprising particular free access zones. In other words, the locking device (101) can be activated on command from a predetermined zone of the frame (2), which can be positioned with great flexibility, based on any access needs. For example, the automatic warehouse (1) can be placed near other structures on all sides thereof, except for the front side, which remains accessible for introducing and removing objects.

In the embodiments in figures from 2 to 6, the support member (103) is in a flexible form. In particular, the support member (103) is sliding with respect to the frame (2) along a path defined by return members (15), preferably, rolling members, to which the support member (103) is constrained on sliding. The return members (15), preferably pulleys, are associated with the frame (2) so as to define a path, which has two vertical portions, placed along the sides (8a,8b) of the frame (2), for the first and the second portion (104, 105) of the support member (103). A cross portion of the support member (103), which is intermediate between the first and the second portion (104, 105), is substantially oriented horizontally. To this end, at least two return members (15) are placed close to the upper zone of the sides (8a,8b) of the frame (2).

The first portion (104) of the support member (103) comprises a confirmation element (16). For example, the confirmation element (16) is placed at the free end of the first portion (104). Preferably, but not necessarily, the confirmation element (16) is in the shape of a section body and/or has greater dimensions than the first portion (104). In turn, the platform (4) comprises a receiving portion (17), configured to hook to the confirmation element (16). In particular, the first portion (104) is shaped so as to be able to slide with respect to the receiving portion (17) to a position, in which the confirmation element (16) reaches the receiving portion (17) and hooks to the latter. In the illustrated, non-exclusive embodiment, the first portion (104), provided with the confirmation element (16), is arranged along the first side (8a) of the frame (2). The receiving portion (17) is arranged at one side of the platform (4) facing and/or close to the first side (8a). For example, the receiving portion (17) is in the shape of an eyelet, inside which the first portion (104) is freely sliding. The eyelet has a smaller breadth than the minimum transverse dimension of the confirmation element (16), so that, in any case, the latter hooks to the receiving portion (17), locking the sliding of the first portion (104).

The frame (2) comprises a first retainer (M1) configured to hook or release the first portion (104) on command.

Figure 2:
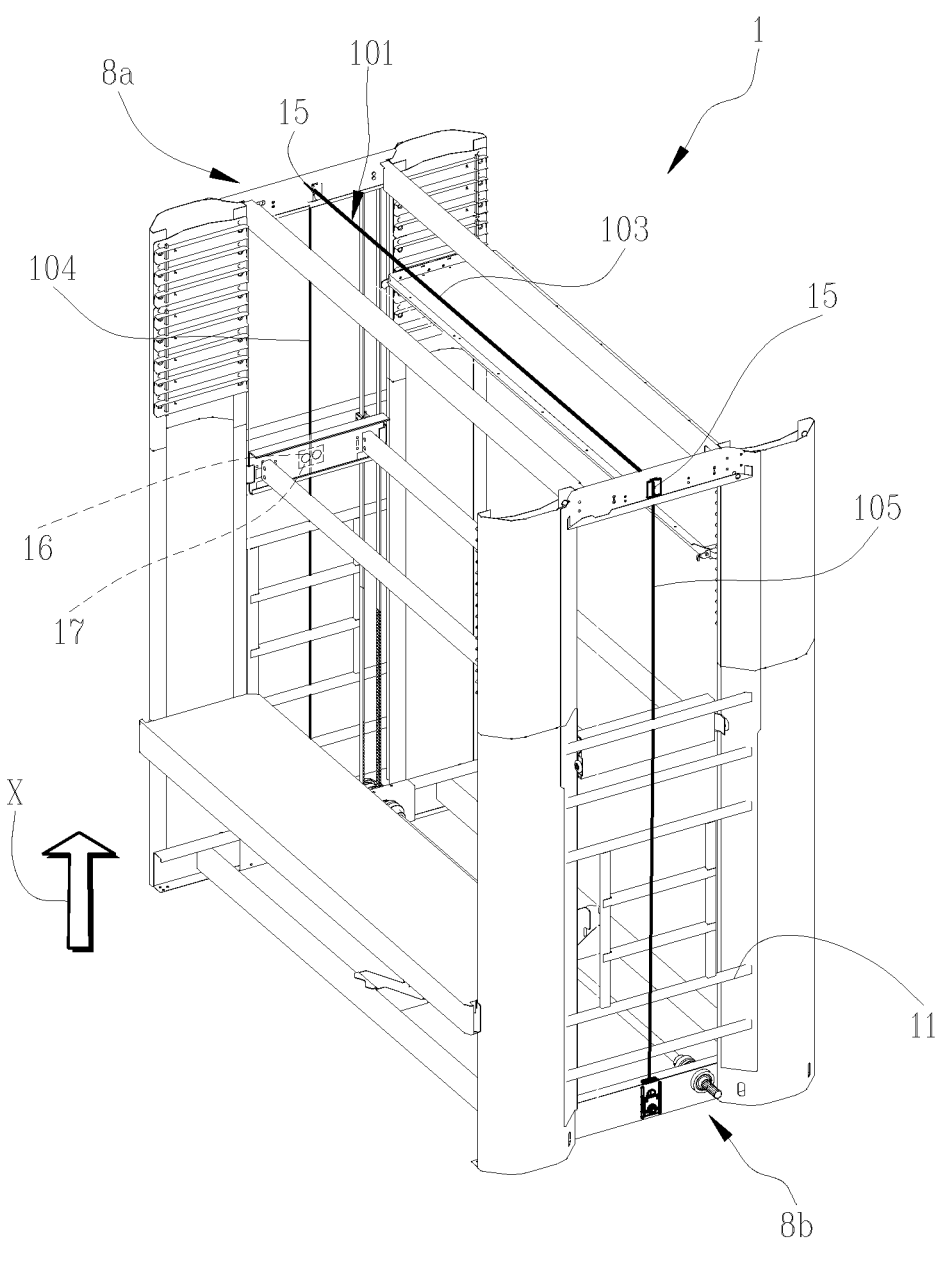
FIG. 2 shows an isometric schematic view of a vertical automatic warehouse and an embodiment of a locking apparatus in a release configuration according to the present invention.

In the release configuration, shown in FIG. 2, the first portion (104) of the support member (103) is hooked to the first retainer (M1) and sliding with respect to the platform (4). In particular, the first retainer (M1) is positioned at the lower part of a first side (8a) of the frame (2). In the release configuration, the confirmation element (16) is constrained to the first retainer (M1), for example, as shown in FIG. 3C, and, being in the lower part of the first side (8a), it doesn't hinder the vertical sliding of the platform (4). In fact, in the conditions shown in FIG. 2, the platform (4) can slide along the first portion (104), since the receiving portion (17) doesn't meet the confirmation element (16) and slides freely along the first portion (104).

In the locking configuration, the first portion (104) of the support member (103) is unhooked from the first retainer (M1) and hooked to the receiving portion (17) of the platform (4), while the second portion (105) is constrained to the frame (2). In an alternative, non-illustrated embodiment, the second portion (105) could be constrained to a second point of the platform (4), or both to the frame (2), and to a second point of the platform (4). The locking configuration is substantially obtained by freeing the first portion (104) from the first retainer (M1), and lifting the confirmation element (16) towards the platform (4), until the confirmation element (16) is brought to engage with the receiving portion (17). In such conditions, the platform (4) cannot go below the confirmation element (16) and, since the second portion (105) is constrained to the frame (2) and/or to a second point of the platform (4), the platform (4) is sustained at a predetermined height by the support member (103). The support height of the platform (4) is substantially the height at which the confirmation element (16) lies. Thus, operatively, to lock the platform (4), in the position in which it lies at a given moment, after stopping the platform (4), it is sufficient to free the first portion (104) from the first retainer (M1) and lift the confirmation element (16) towards the platform (4), until it is brought to engage with the receiving portion (17). Successively, the second portion (105) must be constrained to the frame (2) or to a second point of the platform (4).

In order to go from the locking configuration to the release configuration, the second portion (105) must be unhooked from the frame (2) or from the second point of the platform (4). Thus, by acting on the means, which move the elevator (3) vertically, (means known in the sector and thus not shown in detail) the descent of the elevator (3) is controlled, bringing it into the lowest position, in which the first portion (104) is hooked to the first retainer (M1) again.

In a possible embodiment, the first retainer (M1) is configured to release the first portion (104) if a traction force is applied to the latter, which is greater than a predetermined value. For example, the first retainer (M1) comprises a magnet, as schematically shown in FIG. 3C, or an elastic hooking device. In normal operating conditions of the elevator (3), i.e. in the release configuration of the locking device (101), the first portion (104) is held in position by the first retainer (M1), i.e. it is hooked to the first retainer (M1), or is magnetically held by the first retainer (M1) as schematically shown in FIG. 3C. To move to the locking configuration, it is sufficient to exert a traction on the second portion (105) of the support member (103), a traction of such intensity as to overcome the hooking force exerted by the first retainer (M1), for example, the force of magnetic attraction or an elastic force applied to the first portion (104) and/or to the confirmation element (16). The second portion (105) is subsequently pulled to slide and lift the confirmation element (16) until it meets the receiving portion (17). At this point, the second portion (105) can be constrained to the frame (2) or to the platform (4) itself, so the platform (4)

cannot go below the position reached. This is because, in a configuration, in which the first portion (104) is constrained to the platform (4) and the second portion (105) is constrained to the platform (4) or to the frame (2), the platform (4) cannot move vertically. In particular, in the illustrated embodiments, the support member (103) has the first portion (104) oriented vertically, close to a first side (8a) of the frame (2), and the platform (4) is hanging on the first portion (104).

To go back to the release configuration, by acting on the means, which move the elevator (3) vertically, the elevator (3) is brought into the lowest position, i.e. into the position, in which the first retainer (M1) hooks the first portion (104) and/or the confirmation element (16). In such position, the first retainer (M1) is capable of exerting, on the first portion (104) and/or on the confirmation element (16), a force, which is such as to retain the portion (104) and/or the confirmation element (16) also when commanding the ascent of the elevator (3).

To allow the constraining of the second portion (105) to the frame (2) or to a second point of the platform (4), the locking device (101) comprises a second retainer (19), which is integral with the frame (2) or with the platform (4), which is configured to hook or release the second portion (105), on command, in the locking configuration or in the release configuration of the locking device (101) respectively.

Figure 3:
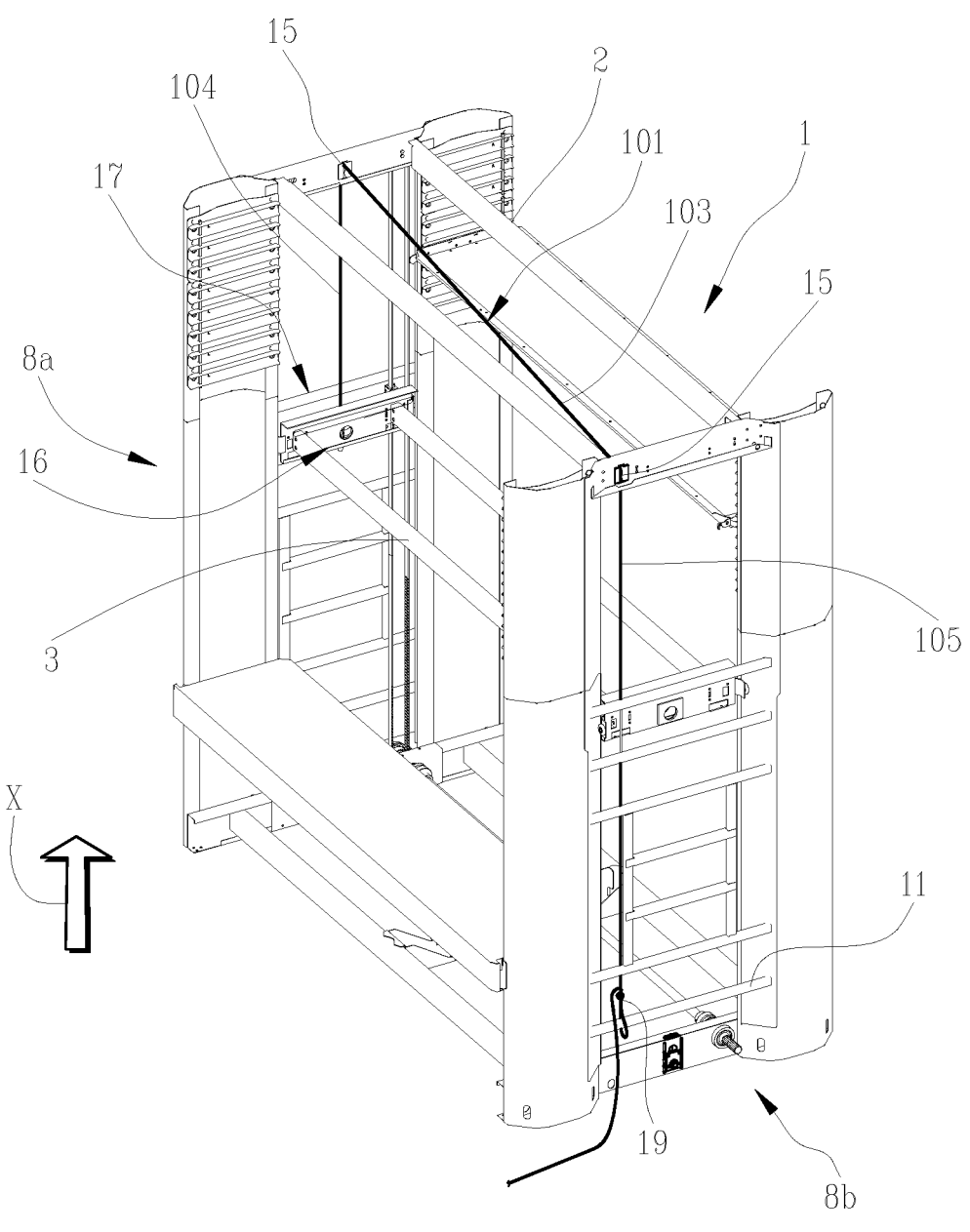
FIG. 3 shows an isometric schematic view of a vertical automatic warehouse and an embodiment of a locking apparatus in a locking configuration according to the present invention.
Figure 4:
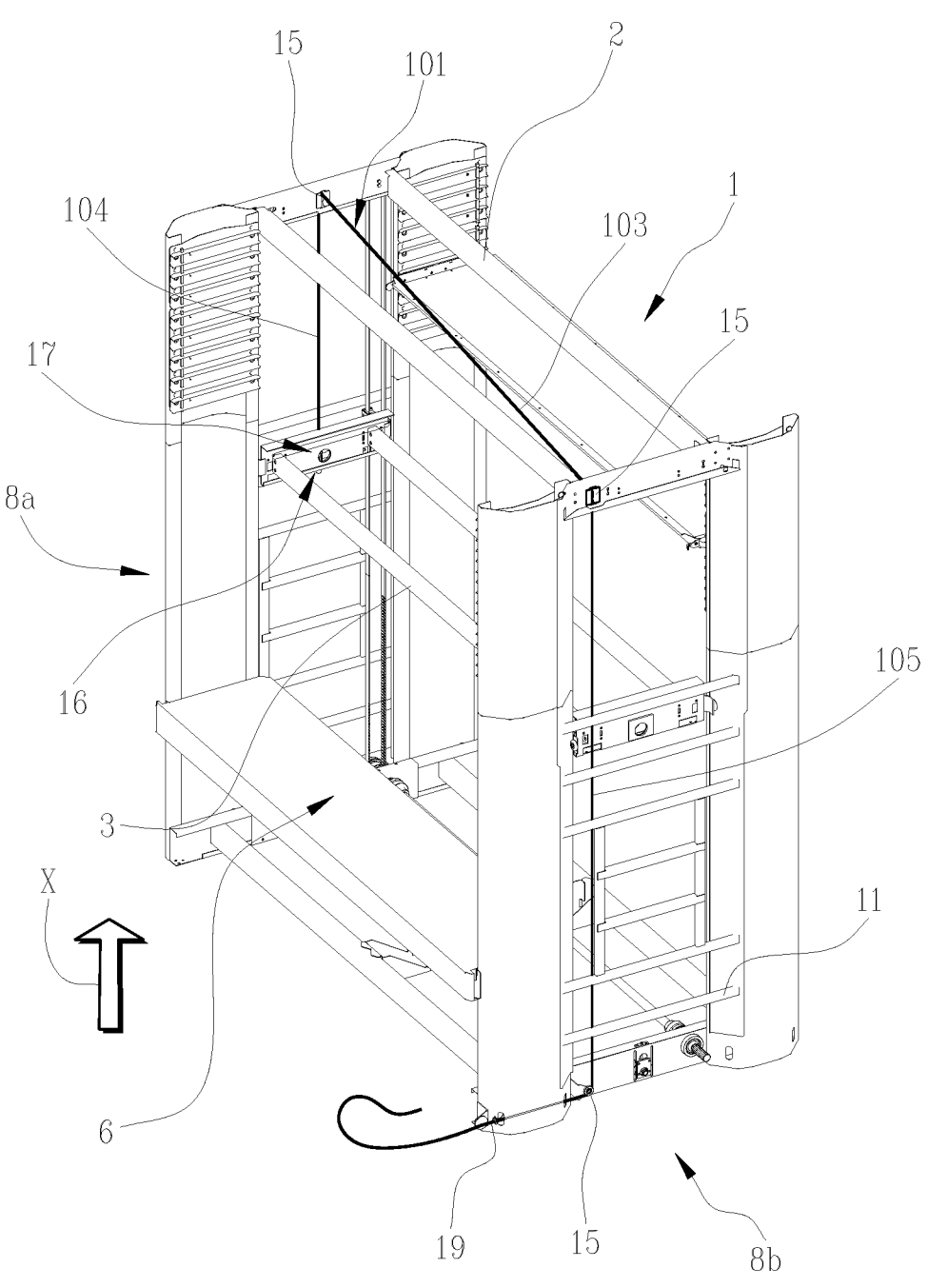
FIG. 4 shows an isometric schematic view of a vertical automatic warehouse and a further embodiment of a locking apparatus in a locking configuration according to the present invention.

For example, the second retainer (19) comprises a clamp, hook or another equivalent device, which can be hooked to the frame (2) or to a second point of the platform (4) on command. The hooking can be carried out, for example, on one of the rungs (11) of a ladder (10), or on another part of the frame (2). The second retainer (19) can be hooked to the second side (8b) of the frame (2), as shown in FIGS. 2 and 3, or to a point placed on the front face (6) of the frame, depending on which is the most convenient point of access for the operator, as shown in FIG. 4.

Even if it is not necessary for locking the platform (4), but only for greater security, the side of the platform (4) facing the second side (8b), i.e. the side opposite the side to which the first portion (104) of the support member (103) is constrained, can be constrained, in turn, to the frame (2) using a ratchet strap or another equivalent device.

The section of the second portion (105) of the support member (103), which is recovered to lift the first portion (104), remains slack, downstream of the second retainer (19), and can be picked up and/or compacted on the ground or in another position.

Figures 5, 5B:
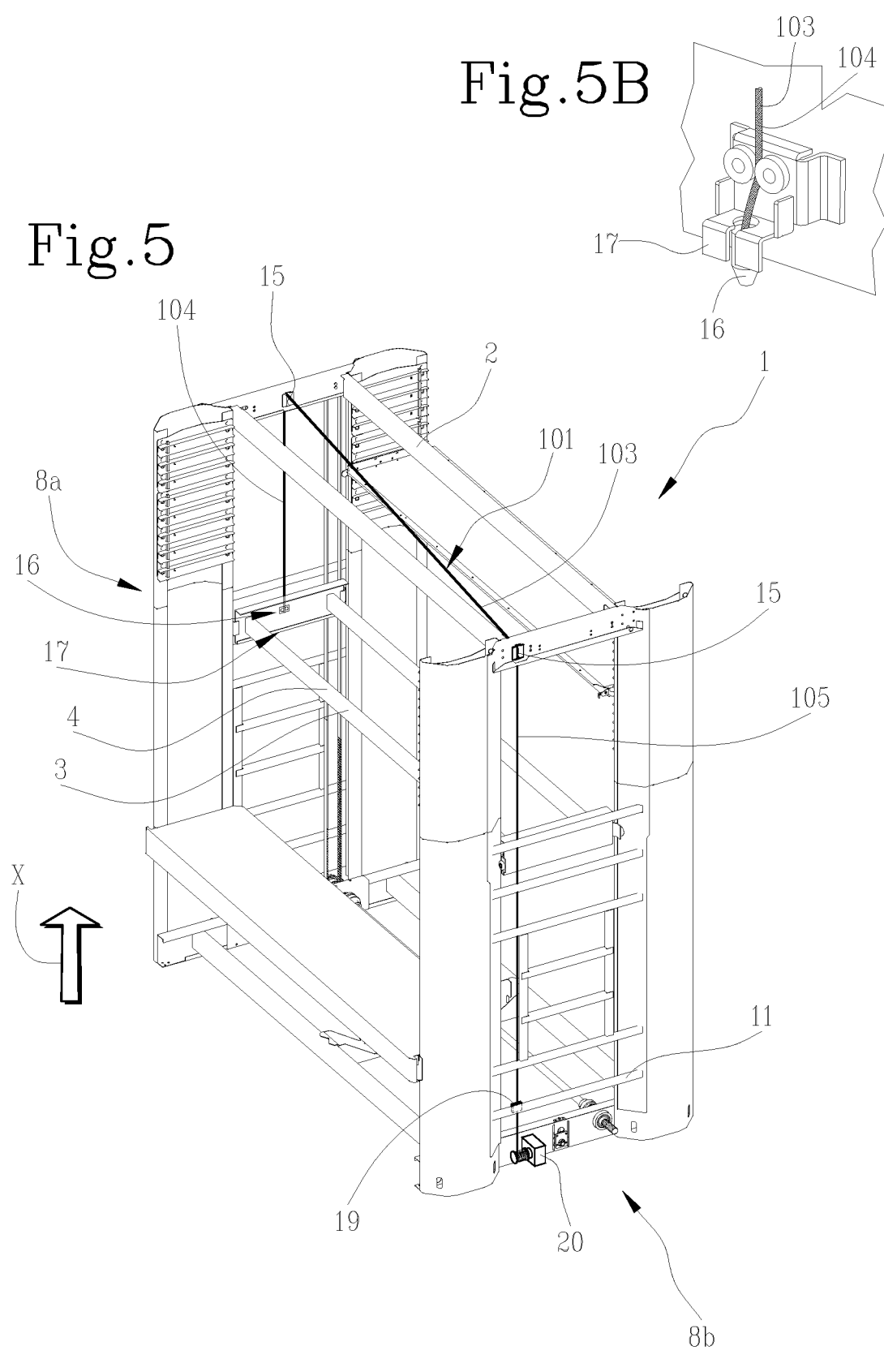
FIG. 5 shows an isometric schematic view of a vertical automatic warehouse and a further embodiment of a locking apparatus in a locking configuration according to the present invention.
FIG. 5b shows a second detail of the locking apparatus according to the present invention.
Figure 6:
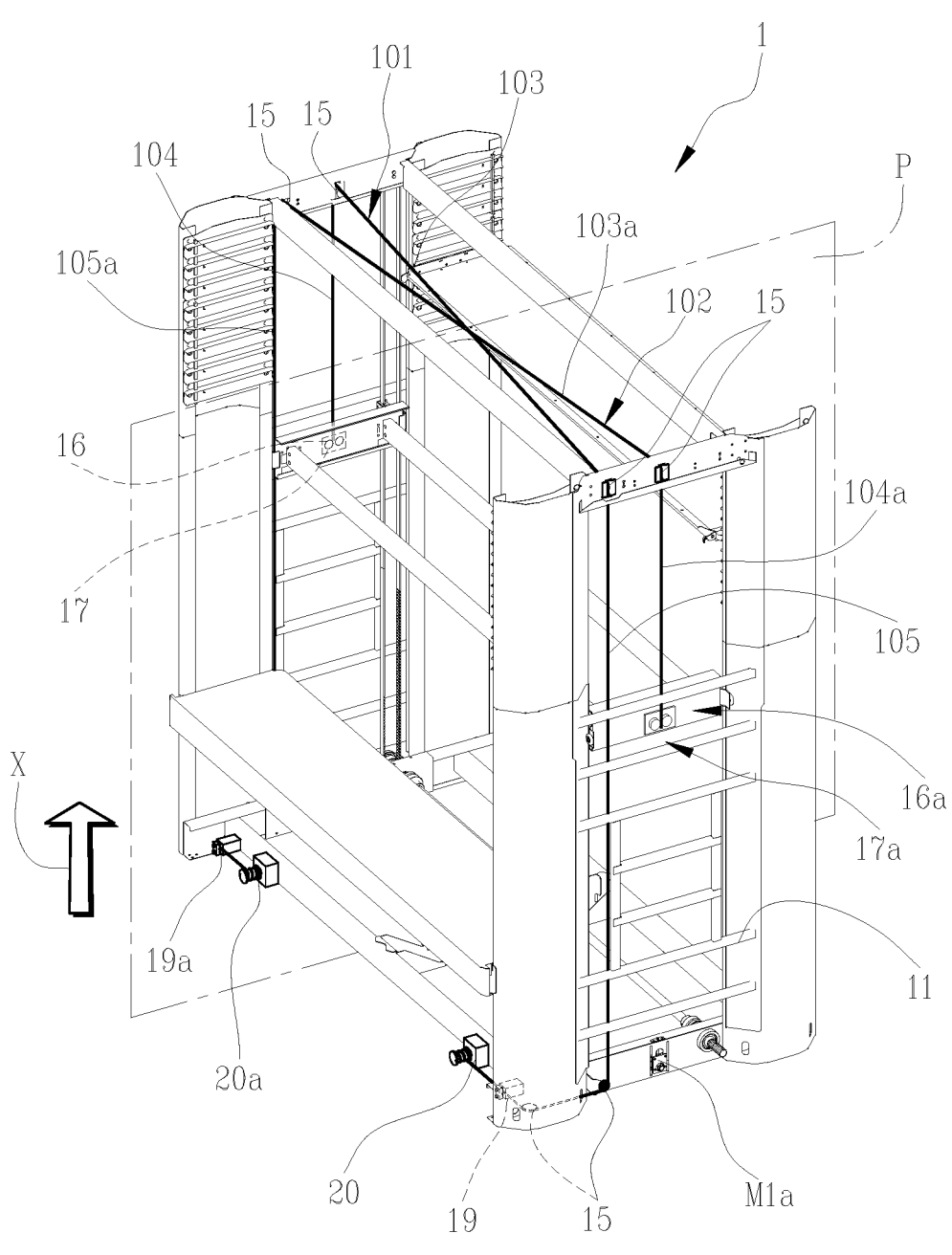
FIG. 6 shows an isometric schematic view of a vertical automatic warehouse and a further embodiment of a locking apparatus in a locking configuration according to the present invention.

Advantageously, the automatic warehouse (1) according to the invention can be provided with an automatic winder (20), associated with the frame (2) and configured to wind the section of the second portion (105) arranged downstream of the second retainer (19). The automatic winder (20) can be placed close to the second side (8b), as shown in FIG. 5, or close to the front face (6) of the frame (2), as shown in FIG. 6. In this last case, the second portion (105) is deviated to the automatic winder (20) by means of one or more return members (15) positioned in the lower part of the second side (8b).

In a possible embodiment, the second retainer (19) is integrated in the automatic winder (20), i.e. the automatic winder (20) is provided with a unidirectional winding mechanism, which allows the second portion (105) to be wound or unwound freely, on command, or it allows the winding and prevents the unwinding of the second portion (105). In this case, after collecting the section of the second portion (105) needed to lift the first portion (104) to the desired height, the second retainer (19) is actuated to prevent the unwinding of the section of the collected second portion (105).

Figure 8:
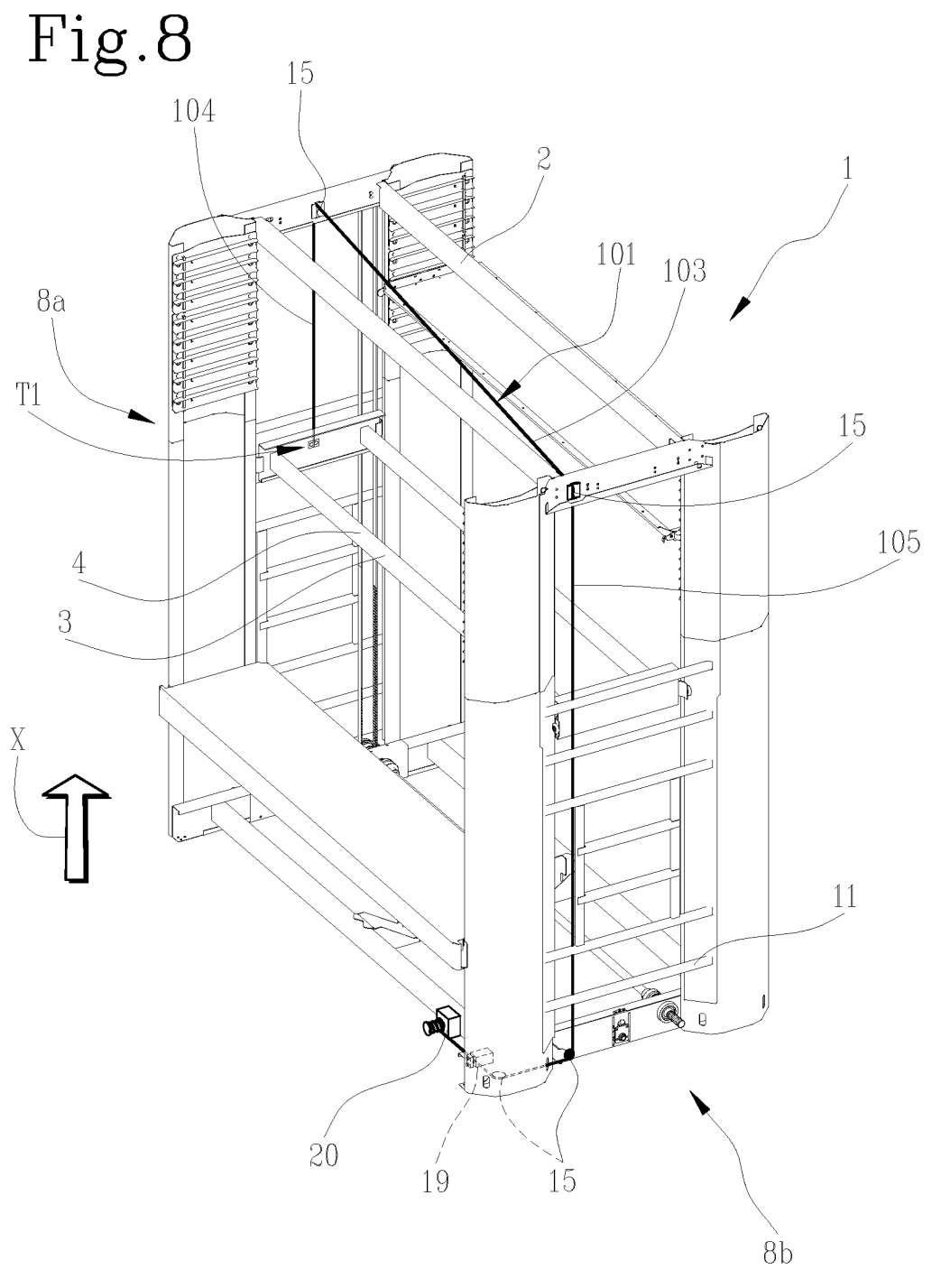
FIG. 8 shows an isometric schematic view of a vertical automatic warehouse and a further embodiment of a locking apparatus in a locking configuration according to the present invention.

In a possible embodiment, shown in FIG. 8, the first portion (104) of the support member (103) is stably constrained to the platform (4) by means of a retainer (T1) and follows the platform (4) in the vertical movements. The second portion (105) is collected and continuously unwound by the automatic winder (20). In particular, during the ascent of the platform (4), the second portion (105) is gradually wound onto the automatic winder (20), whereas, during the descent, it is gradually unwound. In this case, to lock the platform (4) in position, it is sufficient to actuate the second retainer integrated in the automatic winder (20).

In the embodiments described above thus far, the first portion (104) of the support member (103) is arranged close to a first side (8a) of the frame (2), while the second portion (105) is arranged close to the second side (8b) of the frame (2). In the locking configuration, the first portion (104) is constrained to the side of the platform (4) close to the first side (8a), while the second portion (105) is constrained to the second side (8b), or close to the latter, or to the side opposite the platform (4).

In a further possible embodiment, the automatic warehouse (1) comprises a second locking device (102), which is substantially equal to the first locking device (101), arranged symmetrically to the latter with respect to a middle vertical plane (P) of the frame (2), which is, for example, also a plane of symmetry for the sides (8a,8b)). In turn, the second locking device (102) comprises a support member (103a), a first (M1a) and a second (19a) retainer, arranged symmetrically to the same components as the first locking device (101) with respect to the medium vertical plane (P). The second locking device (102) comprises a confirmation portion (16a), associated with the first portion (104a) of the support member (103a), and a receiving portion (17a), associated with the platform (4) on the side opposite the side with which the receiving portion of the first support member (103) is associated. One embodiment with two locking devices (101, 102) is illustrated in FIG. 6, with the use of two automatic winders (20,20a) of the type described above. In this embodiment, in the locking configuration, the platform (4) is supported on two opposite sides. Advantageously, this embodiment can be used when accessibility to the two sides of the automatic warehouse (1) is precluded.

Figure 7:
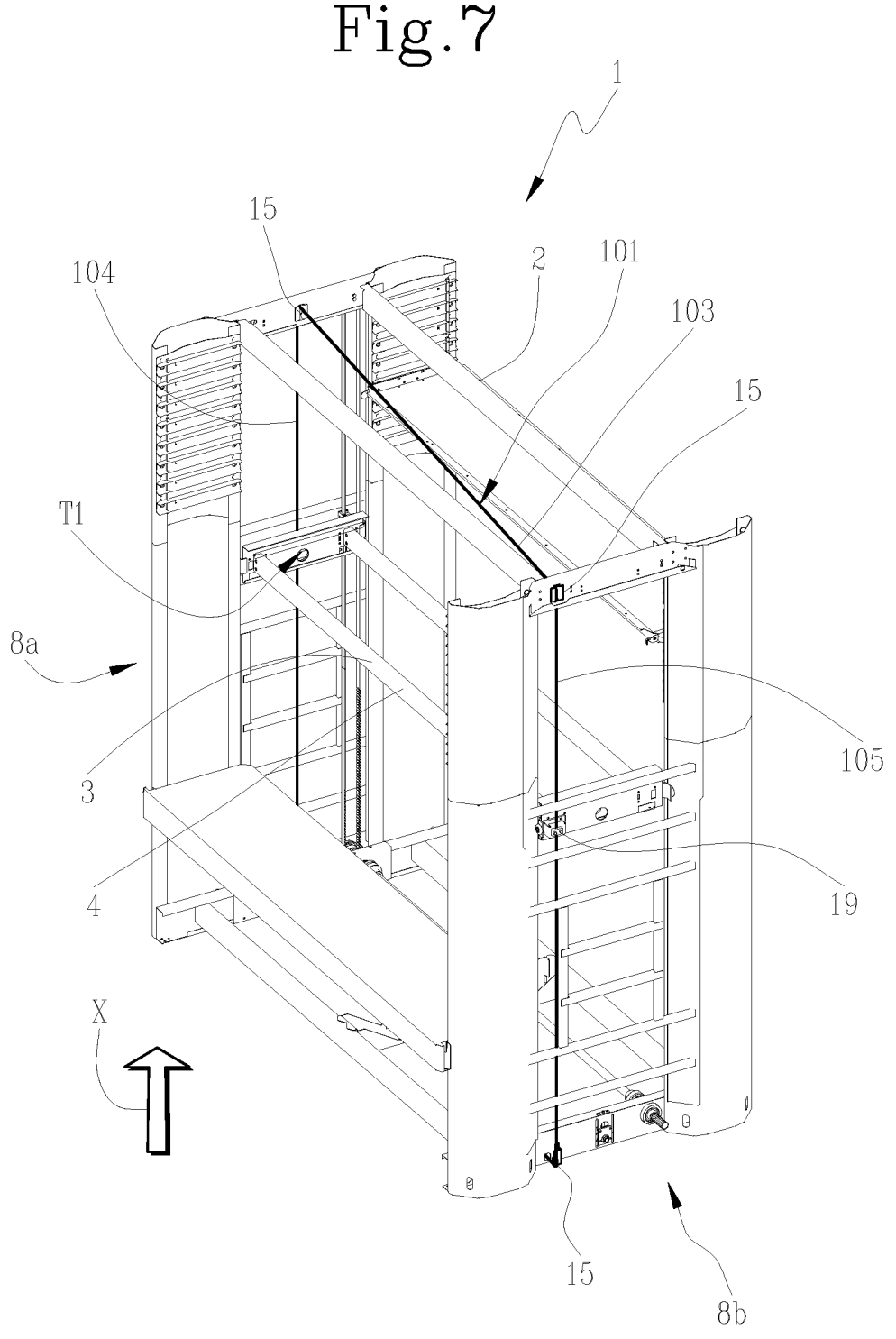
FIG. 7 shows an isometric schematic view of a vertical automatic warehouse and a further embodiment of a locking apparatus in a locking configuration according to the present invention.

In a further possible embodiment, illustrated in FIG. 7, the support member (103) is closed in a ring and sliding with respect to the frame (2) along a closed path. Such path is defined by means of a plurality of return members (15).

In this embodiment, the locking device (101) comprises a first retainer (T1) associated with the platform (4), preferably at one side of the platform (4) facing a first side (8a) of the frame (2). The support member (103) has a first portion (104) hooked to the platform (4) by means of the first retainer (T1).

The locking device (101) further comprises a second retainer (19), designed to hook, on command, to a second portion (105) of the support member (103), spaced apart from the first portion (104). Preferably, the second retainer (19) is associated with a second side of the platform (4), opposite the side on which the first retainer (T1) is placed. Such second side of the platform (4) is facing the second side (8b) of the frame (2).

In the locking configuration, the second portion (105) is constrained to the platform (4) by means of the second retainer (19), to lock the vertical sliding of the platform (4) with respect to the frame (2). In the release configuration, the second retainer (19) releases the second portion (105), which is free to slide with respect to the platform (4), allowing the platform (4) to move vertically to the frame (2). In this embodiment, too, the safety locking of the platform (4) can be done by accessing only the second retainer (19), i.e. by accessing only one side (8*b*) of the frame (2). The other side (8*a*) can be placed next to another structure for needs of positioning of the automatic warehouse (1).

A further embodiment, which is not illustrated, can be obtained from the one shown in FIG. 7 by associating the second retainer (19) with the frame (2) on the side opposite the one in which the first retainer (M1) is positioned. Associating the second retainer (19) with the frame (2) instead of with the platform (4) makes the use of ratchet straps or equivalent devices necessary, to secure the side of the platform (4) opposite the side of the first retainer (M1) to the frame (2).

Figure 9:
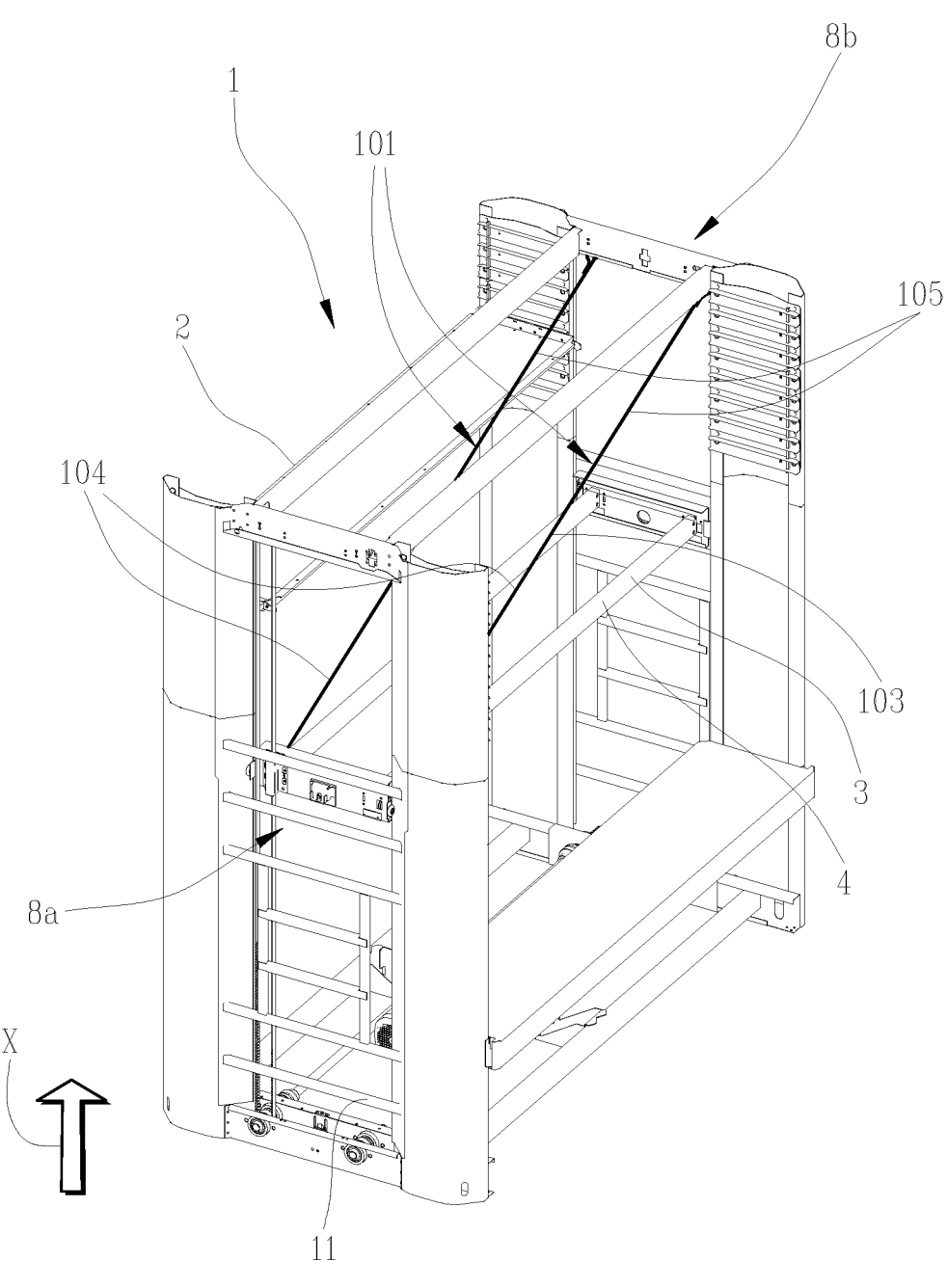
FIG. 9 shows an isometric schematic view of a vertical automatic warehouse and a further embodiment of a locking apparatus in a locking configuration according to the present invention.

In a further possible embodiment, illustrated in FIG. 9, the support member (103) has a first portion (104) hooked to the platform (4), and a second portion (105), spaced apart from the first portion (104). In the release configuration, the second portion (105) isn't anchored to the frame (2) and the platform (4) is free to move vertically. In particular, in the release configuration, the second portion (105) can be associated with the platform (4), without interacting with the frame (2). For example, in this embodiment, the support member (103) is in the shape of a cable or a pair of cables, stably constrained to the platform (4) at the first portion (104). In the release configuration, i.e. in conditions of normal elevator use, the second portion (105) is associated with the platform (4), but not with the frame (2), i.e. it is arranged on board the platform (4).

In the locking configuration, the second portion (105) is anchored to the frame (2) in a stable position, to lock the vertical sliding of the platform (4) to the frame (2). In the locking configuration, the platform (4) is hung on the frame (2) by means of the support member (103) or the pair of support elements (103). Preferably, the first portion (104) is constrained to a first side of the platform (4) close to the first side (8*a*) of the frame (2). In the locking configuration, the second portion (105) is constrained to the second side (8*b*) of the frame (2). In this case, to lock the platform (4) in a safety position, the possibility of access to the second side (8*b*) is sufficient.

Figures 10, 10B:
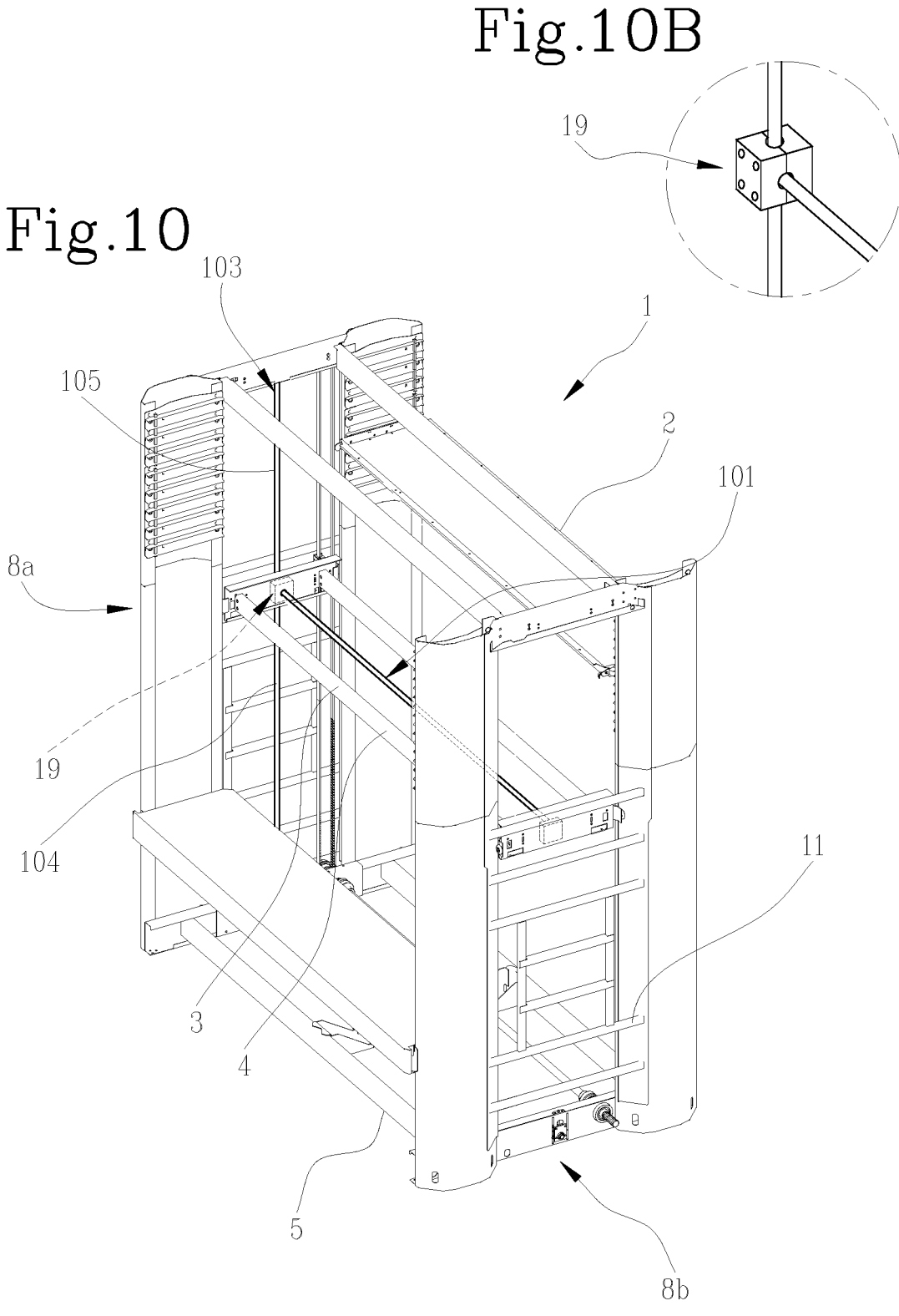
FIG. 10 shows an isometric schematic view of a vertical automatic warehouse and a further embodiment of a locking apparatus in a locking configuration according to the present invention.
FIG. 10b shows a detail of the locking apparatus in FIG. 10.

In a further embodiment, illustrated in FIG. 10, the support member (103) has a first portion (104) and a second portion (105). The support member (103) is stably constrained to the frame (2), at at least one of the second portion (105) and the first portion (104). For example, the support member (103) is associated with the frame (2) at the first side (8*a*). The support member (103) is oriented vertically.

The locking device (101) comprises a retainer (19), associated with the platform (4), configured to hook or release the support member (103), on command. In the locking configuration, the retainer (19) hooks the support member (103), to prevent the vertical movement of the platform (4). In the release configuration, the retainer (19) doesn't hook the support member (103), to allow the vertical movement of the platform (4). In the release configuration, the retainer (19) is free to slide along the support member (103), integral with the platform (4). In the embodiment in FIG. 10, the support member (103) can be made in a flexible or rigid form. Preferably, the support member (103) is made in a rigid form. The embodiment in FIG. 10 offers the advantage of substantially occupying only one side (8*a*) of the frame (2). Using means known in the sector, the operator is able to control the locking and release of the retainer (19) by acting on the second side (8*b*) of the frame (2).

The invention claimed is:

1. An automatic warehouse, comprising:
a frame, defining a prismatic-shaped containment volume, with a vertical axis;
an elevator, arranged inside the containment volume, comprising a platform, movable along a vertical direction; and
a locking device, interposed between the frame and the elevator, which is operable between a locking configuration, in which the elevator is constrained to the frame with respect to the vertical movements and is unable to move vertically, and a release configuration, in which the elevator is able to move vertically;
wherein the locking device comprises at least one support member, connected to the frame so as to be able to support a weight associated with the platform;
wherein in the locking configuration, the support member has a first portion, constrained to a first point of the platform, and a second portion, spaced apart from the first portion, constrained to at least one of the frame or to a second point of the platform, so that the platform is locked with respect to the sliding along the vertical axis and the weight associated with the platform is supported by the frame by the support member;
wherein in the release configuration, the support member is not constrained to the platform or is not constrained to the frame, to allow a free movement of the platform along a vertical direction; and
wherein the support member is flexible.

2. The automatic warehouse according to claim 1, wherein:
in the locking configuration, the support member has a first portion, hooked to the platform, and a second portion, spaced apart from the first portion, anchored in a stable position to the frame and/or to a second point of the platform, to lock the vertical sliding of the platform to the frame; and
in the release configuration, the support member has at least one of the first portion and the second portion anchored in a stable position to the frame, while the platform isn't hooked to the support member and is free to slide with respect to the support member.

3. The automatic warehouse according to claim 2, wherein:
the first portion of the support member comprises a confirmation element;
the frame comprises a first retainer configured to hook or release the first portion on command;
the platform comprises a receiving portion, configured to hook to the confirmation element;
in the release configuration, the first portion of the support member is hooked to the first retainer and the platform is sliding with respect to the first portion; and
in the locking configuration, the first portion of the support member is unhooked from the first retainer and hooked to the receiving portion of the platform.

4. The automatic warehouse according to claim 3, wherein the first retainer is configured to release the first portion if a traction force is applied to the latter, which is greater than a predetermined value.

5. The automatic warehouse according to claim 3, further comprising a second retainer, integral with the frame or with the platform, which is configured to hook or release the second portion, on command, in the locking configuration or in the release configuration of the locking device respectively.

6. The automatic warehouse according to claim 5, further comprising an automatic winder, associated with the frame, configured to wind a section of the second portion arranged downstream of the second retainer.

7. The automatic warehouse according to claim 5, wherein the second retainer is integrated in the automatic winder, the automatic winder being provided with a unidirectional winding mechanism, which allows the second portion to be wound or unwound freely, on command, or allows the winding and prevents the unwinding of the second portion.

8. The automatic warehouse according to claim 1, further comprising a further locking device, substantially equal to said locking device, arranged symmetrically to the locking device with respect to a vertical plane of the frame.

9. The automatic warehouse according to claim 1, wherein:

the support member is closed in a ring and sliding with respect to the frame along a closed path;

the support member has a first portion hooked to the platform by means of a first retainer, in a first part facing a first face of the frame;

the platform comprises a second retainer, arranged in a second part facing a second face of the frame;

in the locking configuration, a second portion, spaced apart from the first portion, is constrained to the platform by means of the second retainer, to lock the vertical sliding of the platform to the frame; and in the release configuration, the second retainer releases the second portion, which is free to slide with respect to the platform, allowing the platform to move vertically to the frame.

10. The automatic warehouse according to claim 1, wherein:

the support member has a first portion, hooked to the platform in a part facing a first face of the frame, and a second portion, spaced apart from the first portion;

in the locking configuration, the second portion is anchored in a stable position to a second face of the frame, to lock the vertical sliding of the platform to the frame; and in the release configuration, the second portion is not anchored to the frame and the platform is free to move vertically.

11. The automatic warehouse according to claim 1, wherein:

the support member has a first portion and a second portion;

the support member is stably constrained to the frame, at least one of the second portion or the first portion;

the platform comprises a retainer configured to hook or release the support member on command;

in the locking configuration, the retainer hooks the support member, to prevent vertical movement of the platform; and in the release configuration, the retainer does not hook the support member, to allow vertical movement of the platform.

12. The automatic warehouse according to claim 1, wherein the support member comprises at least one of: a cord, a cord made of steel, a chain or a belt.

* * * * *